3,389,770
TRANSMISSION HYDRAULIC CONTROL
Kenneth F. Golan, Pekin, David S. Ohaver, Farmington, Shairyl I. Pearce, East Peoria, and Gerald D. Rohweder, Peoria, Ill., assignors to Caterpillar Tractor Co., Peoria, Ill., a corporation of California
Filed Feb. 1, 1966, Ser. No. 523,980
6 Claims. (Cl. 192—87.13)

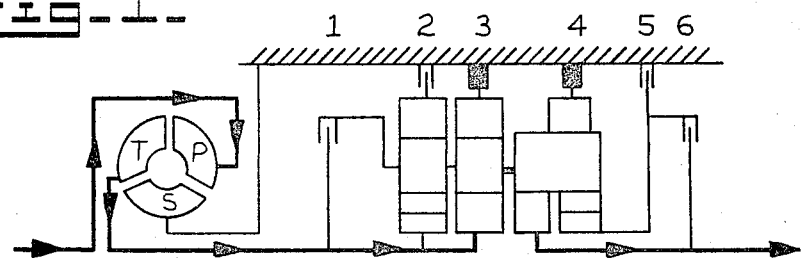
Fig-1-
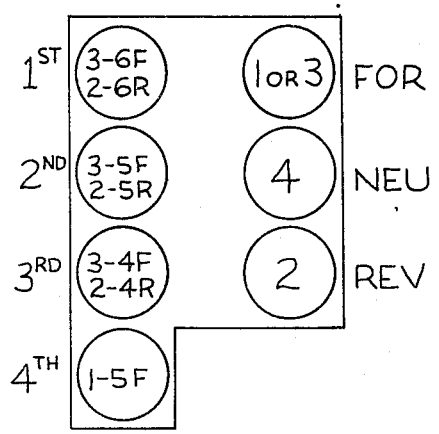
Fig-2-
Fig-4-
Fig-5-
Fig-3-
Fig-6-
INVENTORS
KENNETH F. GOLAN
DAVID S. OHAVER
BY SHAIRYL I. PEARCE
GERALD D. ROHWEDER
ATTORNEYS

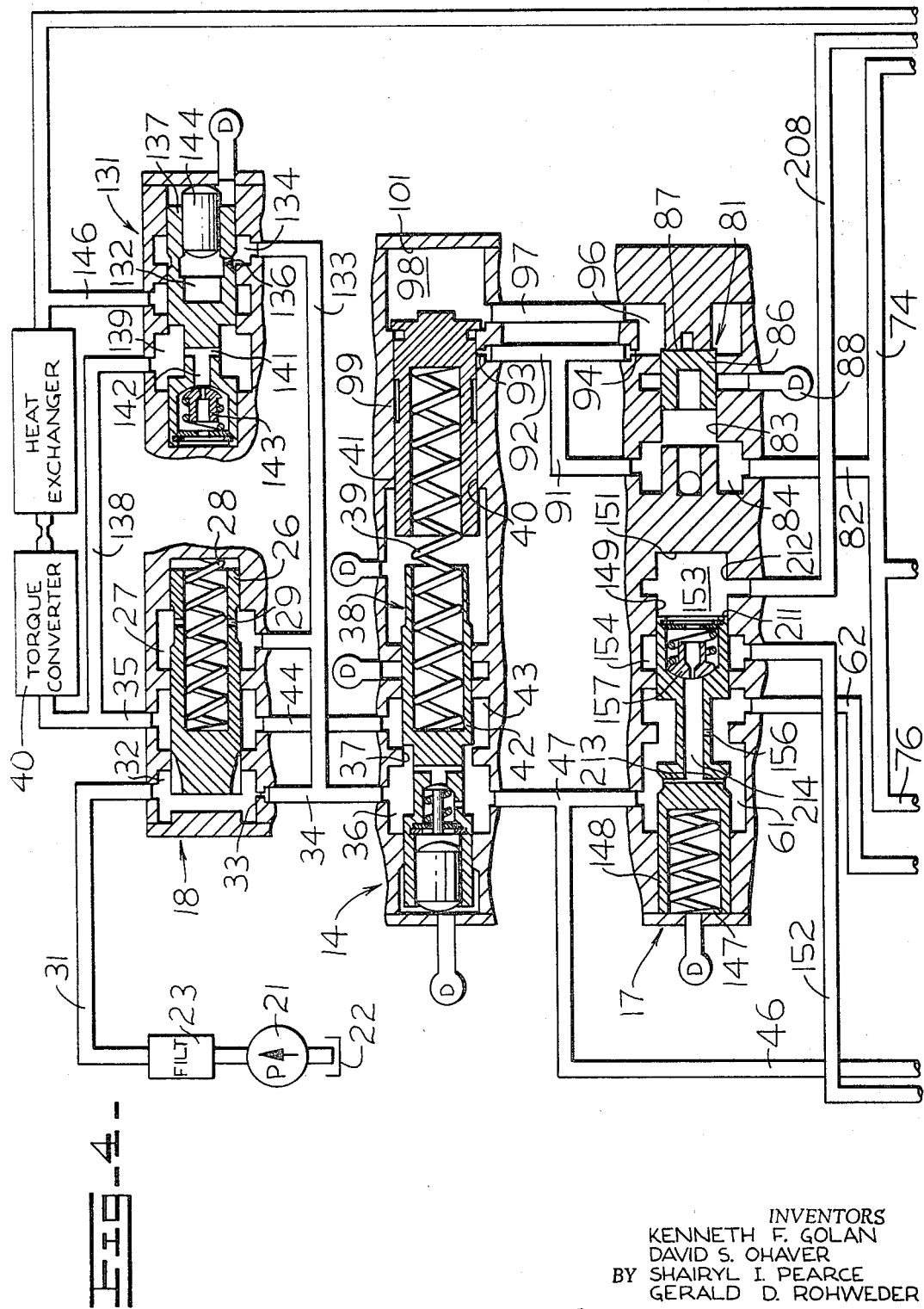

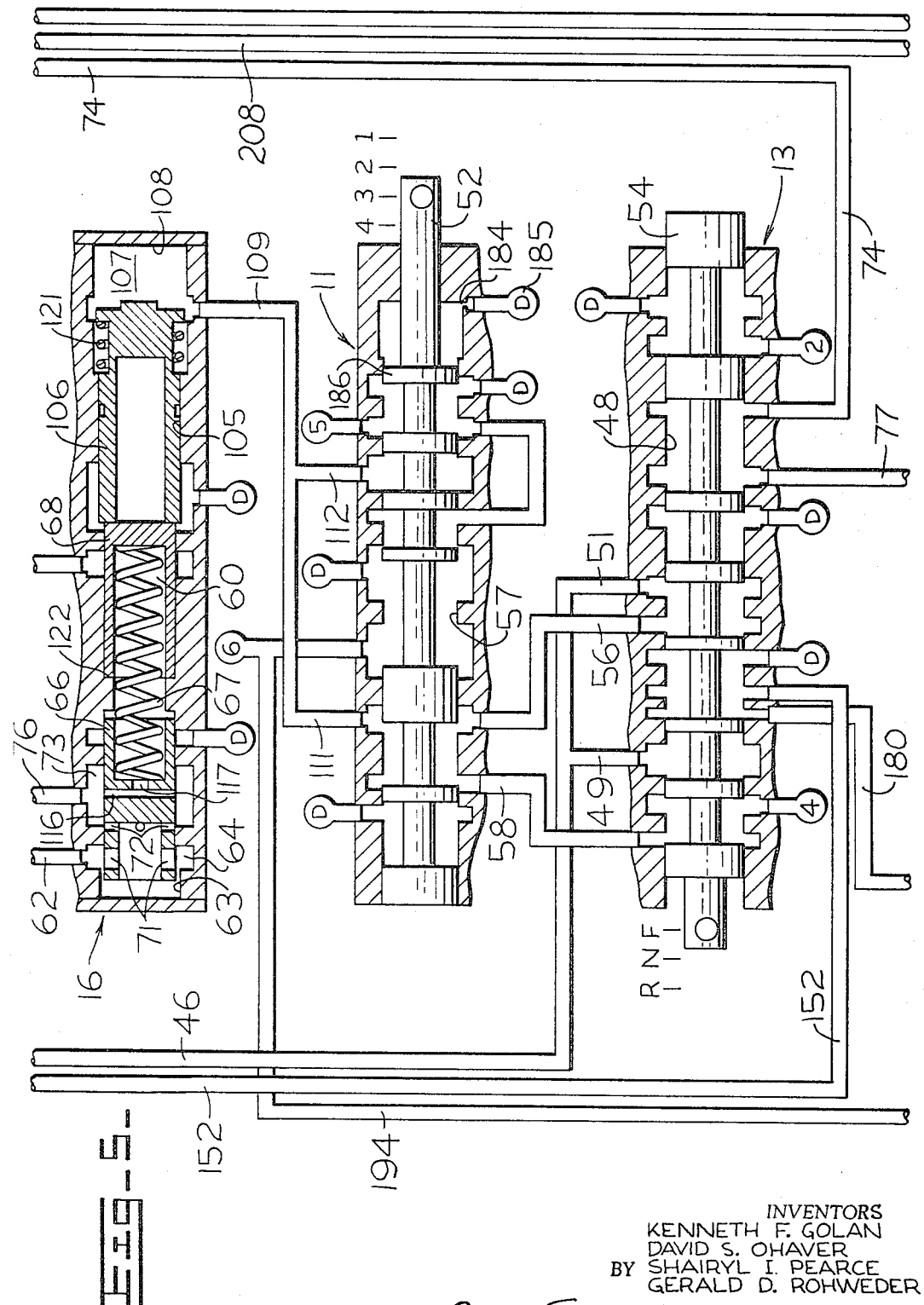

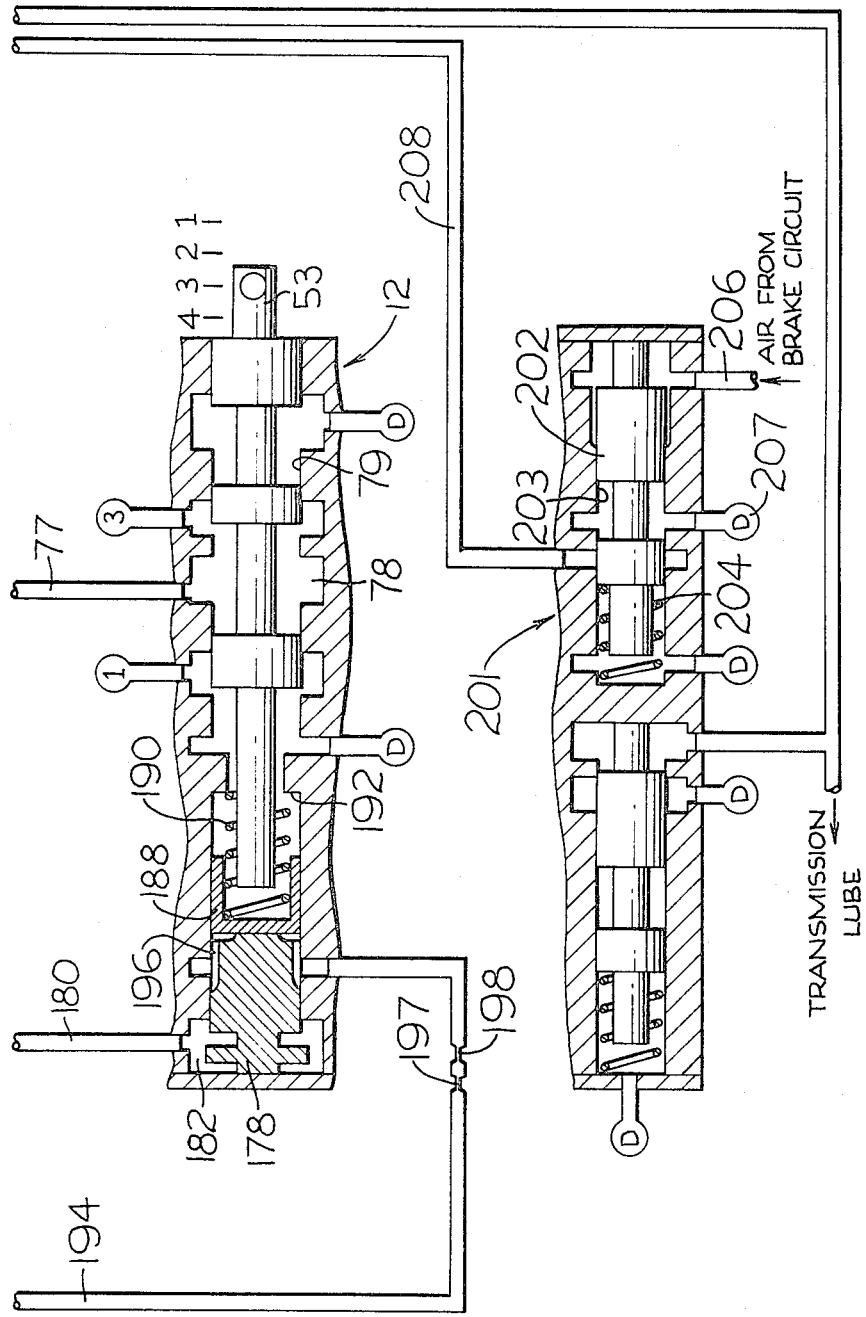

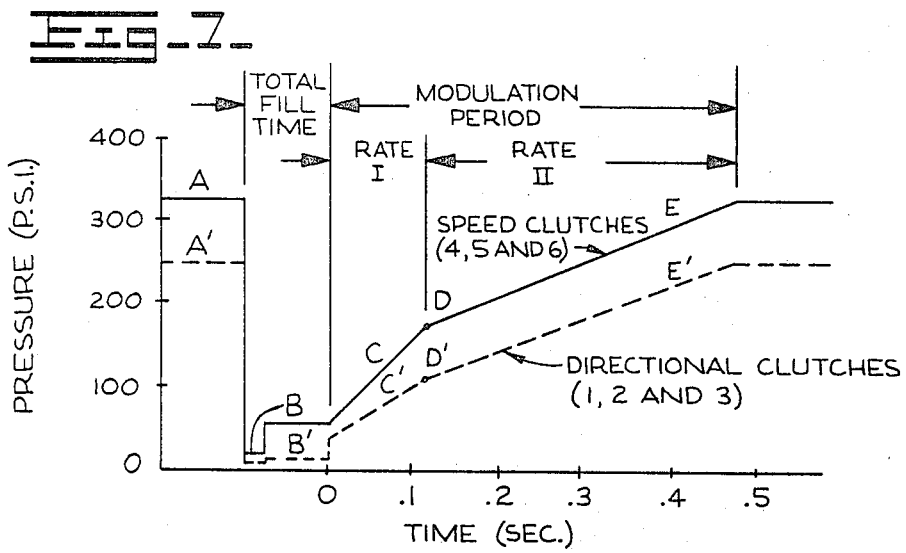
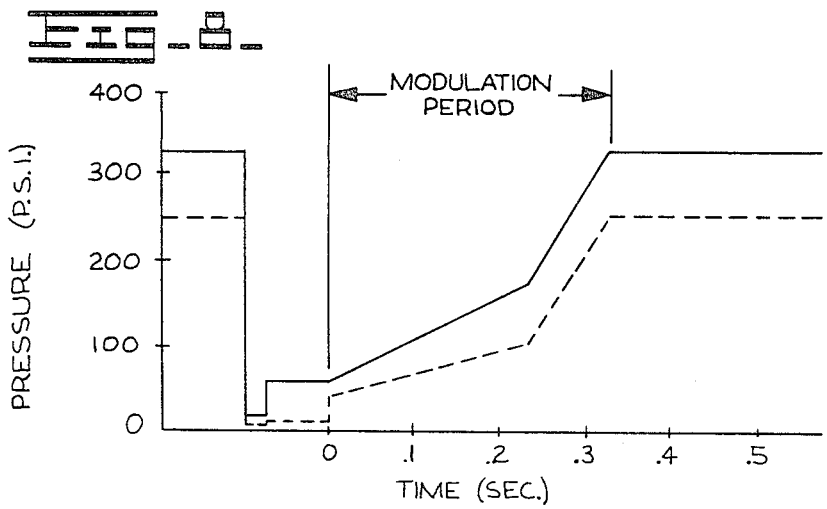
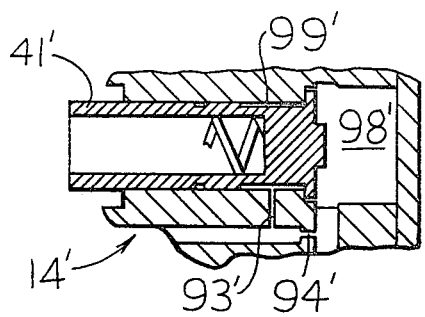
INVENTORS
KENNETH F. GOLAN
DAVID S. OHAVER
SHAIRYL I. PEARCE
GERALD D. ROHWEDER
ATTORNEYS

United States Patent Office 3,389,770
Patented June 25, 1968

ABSTRACT OF THE DISCLOSURE

A hydraulic control which effects drive ratio changes in a planetary transmission of a wheel loader provides for smoother shifts by increasing the fluid pressures applied to the clutches or brakes which are actuated to accomplish the shift at two different rates during the modulation period. The system further maintains a pressure differential between a pair of the clutches and brakes which increases during a first portion of the modulation period and remains constant during a subsequent portion thereof.

---

The present invention relates to a hydraulic control system for a transmission and more particularly to a control system for a transmission specifically designed to meet the requirements of wheel loaders and vehicles having similar operating characteristics.

The present invention is described herein with reference to a transmission which has been specifically designed to meet the needs of a wheel loader but is not necessarily limited thereto. As will become clear from the following description, there are certain operating characteristics associated with a wheel loader which make the present invention extremely advantageous for use therewith. It will be understood by those in the art however that the present invention is also advantageously employed with vehicles other than wheel loaders.

Smooth forward to reverse shifts are a necessity on a wheel loader which continually cycles in a loaded and unloaded condition. Not only is operator and machine fatigue involved, but an abrupt transition from forward to reverse can cause dirt in a heavily loaded bucket to spill onto the operator or the ground. In the latter case, the spilled dirt causes the ground on which the loader operates to become uneven which further disrupts operation, and in the end requires the production cycle to be interrupted or delayed until proper travel surfaces can be restored.

Due to the nature of the work performed by a wheel loader a broad spectrum of ranges is encountered relative to vehicle load and with various engine speeds, and it is necessary to specifically tailor the transmission control to this range. With transmission clutches that are kept to a minimum size for purposes of economy, it has proven to be advantageous to sequence engagement of the clutches by: (1) reducing the energy absorbed in the clutches during full load shifting by increasing the initial rate of clutch pressure engagement relatively rapidly; and (2) controlling the final portion of clutch pressure engagement at a lower rate. Alternately, a transmission which has a relatively large torque capacity compared with the possible vehicle loads should have a control which engages early in pressure rise or modulation portion of the cycle and, therefore a slow rate of pressure rise is initially desirable for smooth clutch engagement since energy absorption is no problem. After the relatively low rate of engagement of a large capacity transmission a relatively rapid rate is desired in order to reduce the modulation period, and hence the duration of interrupted power to the vehicle wheels.

In hydraulic control systems for transmissions presently known in the art it is not uncommon to provide a fixed pressure differential between two clutches which must be engaged in order to condition the transmission for driving the vehicle wheels. When a particular transmission has design parameters which require a larger-than-normal differential valve setting a problem is created in that the initial differential pressure causes extremely rough shifts which, as mentioned above, are to be avoided if at all possible. Since a transmission designed to meet the needs of a wheel loader includes parameters which require a larger-than-normal differential valve setting, it is necessary to provide a control system for the transmission which will eliminate the rough shifts which such a larger-than-normal differential valve setting produces.

Transmissions for which the present invention is specifically provided require means making it unnecessary for the operator of the vehicle to accurately feel or maneuver the transmission control lever under the relatively rapid cyclic conditions of such a vehicle. Thus, the present invention provides an over-shift device to allow rapid first to second shifting while decreasing the possibility of an over-shift to third. Further, while a fourth forward speed is available the configuration of transmission does not provide a fourth reverse speed, and thus the rapid forward-reverse lever operates to automatically downshift the speed selector lever from fourth to third position when the transmission is shifted from forward to reverse while in fourth gear. It also prevents placement of the speed selector lever in fourth position while in reverse.

Accordingly, it is an object of the present invention to provide a hydraulic control system for a transmission which is designed for operation with a vehicle such as a wheel loader wherein the control system produces smooth operation and uncomplicated gear shifting which enables the vehicle operator to direct his attention to the loading and unloading of the vehicle rather than the shifting of the vehicle.

A specific object of the present invention is to provide a hydraulic control system for a transmission wherein the control system includes a modulation valve for varying the pressure directed to a pair of selected clutches, plus a differential valve for maintaining a pressure differential between the two clutches selected wherein the pressure differential valve produces a variable pressure differential over a portion of the modulation cycle.

Further objects of the present invention include providing a novel dual rate modulation valve means including a piston operated relief valve, a novel differential valve means, and a dual purpose safety valve advantageously used in conjunction with a transmission neutralizing system.

Further and more specific objects and advantages of the present invention are made apparent in the following specification when taken together with the drawings:

In the drawings:

FIG. 1 is a schematic illustration of a transmission of the general type for which the present invention is designed;

FIG. 2 is a diagrammatic illustration of the shift pattern for conditioning the transmission of FIG. 1 to one of the four forward speeds or one of the three reverse speeds or neutral wherein the numbers within the circles designating shift positions refer to the transmission clutches which are engaged to produce the desired gear ratios;

FIG. 3 is a diagram showing how FIGS. 4, 5 and 6 are combined to form a single semi-schematic illustration of the control system of the present invention;

FIGS. 4, 5 and 6 are portions of a composite drawing showing in semi-schematic form the control system of the present invention;

FIG. 7 is a pressure versus time graph illustrating the pressure rises produced in selected clutches by the control system of the present invention;

FIG. 8 is a pressure versus time graph illustrating alternate pressure rises which are achieved with a modified form of the present invention; and FIG. 9 illustrates the modification of the control system of FIGS. 4, 5 and 6 which is necessary in order to produce the pressure rises of FIG. 8.

Referring now to FIG. 1, a transmission comprising several epicyclic gear sets is conditioned to transmit torque at various gear ratios depending on which of the several friction engaging means (clutches and brakes) are engaged. The numerals 1–6 in the drawing refer to the friction engaging devices appearing directly therebelow whereby it is possible by referring to FIG. 2 to determine which of the friction engaging devices are engaged to produce the several forward and reverse gear ratios. Friction engaging devices 1, 2 and 3 are referred to as directional (or load) clutches, while the friction engaging devices 4, 5 and 6 are referred to as speed clutches. Each gear ratio is formed by one of the load clutches and one of the speed clutches being engaged; unless one clutch from each set is engaged power will not be transmitted through the gear train. The directional clutches are often referred to as the load clutches as the selected one of the load clutches is conditioned to be engaged after the selected speed clutch and thus operates to pick up the load. The manner in which the control system operates to produce this result will be fully explained below.

Referring now to FIGS. 4, 5 and 6 the main components of the control system of the present invention include valves 11 and 12, the spools of which are linked together (by linkage not shown) for selecting one of the speed clutches and one of the load clutches through movement of a single speed control lever (not shown), a directional selector valve 13 for selecting a load clutch through operation of a separate directional control lever (not shown), a modulating relief valve 14, a pressure differential valve 16, a safety valve 17 and a flow limiting valve 18. A pump 21 draws fluid from a reservoir 22 and delivers it through a filter 23 to valve 18 from which a portion is directed to the modulating relief valve 14. The fluid controlled by modulating relief valve 14 is directed to the selected speed clutch for engagement thereof, and also to the pressure differential valve 16 via safety valve 17. The pressure differential valve 16 reduces the pressure of the fluid controlled by the modulating relief valve 14 and directs it to the selected load clutch. The speed clutches are on the upstream side of the differential valve 16 and the load clutches are on the downstream side, thus assuring a pressure differential between the engaging forces acting on the selected clutches.

One of the outstanding features of the present invention resides in the pressure differential valve 16 in that it does more than simply produce a fixed pressure differential or a proportional pressure differential as is already known in the art. As will be more fully described below, the valve 16 operates to produce a relatively small pressure differential during the beginning of a clutch engagement cycle, then gradually increases the differential pressure as the modulation period continues (valve 14 increases its regulated pressure), and upon reaching a predetermined pressure maintains a fixed differential (which is considerably larger than the initial pressure differential) over the remainder of the modulation cycle.

The graph of FIG. 7 clearly illustrates the relationship between the speed clutch fluid pressure (shown as a solid line) and the load clutch fluid pressure (shown as a dashed line). The details of this graph will be more fully described following a detailed description of the components which comprise the control system of the present invention.

Flow limiting valve 18 comprises a piston 26 slidably disposed in a bore 27 and urged leftwardly by a spring 28. Fluid from filter 23 is directed through conduit 31 to a recess 32 surrounding bore 27 at the leftwardmost end thereof. Fluid flows out of recess 32 through a restrictive orifice 33 which communicates with a passage 34. This fluid is also communicated with bore 27 and the chamber of spring 28 through suitable orifices 29 in piston 26. When the fluid flow through orifice 33 exceeds a predetermined rate, the pressure differential created by orifice 33 operates to compress the spring 28 and urge the piston 26 rightwardly allowing the excess fluid to flow to a passage 35 which leads to the transmission torque converter 40.

Flow limiting valve 18 is vitally important in systems requiring high pump flow since the modulation rates necessary for proper operation of the transmission depend on a source of fluid which is not excessive.

The output from orifice 33 is directed to the modulating relief valve 14 through the passage 34 which is in communication with a recess 36 which surrounds the bore 37 of the modulating relief valve. Disposed within the bore 37 is a valve spool 38 which is urged in a leftward direction by a spring 39 one end of which is connected to the valve spool 38, and the other end of which is connected to a piston 41 which is also slidably disposed within a bore 40 which is slightly larger than bore 37. A land 42 on spool 38 cooperates with a recess 43 to direct fluid from recess 36 to a passage 44 which leads through valve bore 27 to low-pressure passage 35. Thus, when the pressure of the fluid in recess 36 is sufficient to urge the spool 38 rightwardly against the spring 39 a distance sufficient to establish communication between recess 36 and recess 43, further pressure buildup will only be possible by increasing the force with which spring 39 opposes the rightward movement of spool 38. Since piston 41 is slidably disposed within the bore 37, the pressure in recess 36 is made variable by controlling the position of the piston 41 and thus the force with which spring 39 urges spool 38 leftwardly.

Recess 36 communicates with a clutch supply passage 46 via a passage 47. Passage 46 directs the fluid therein to the bore 48 of selector valve 13 at two separate longitudinal positions via branch passages 49 and 51. Depending on the positions of the selector valve spools 52, 53 and 54 of selector valves 11, 12 and 13 respectively, one of clutches 4, 5 and 6 will receive fluid from passage 46 while the other two clutches will be communicated with a drain and thus disengaged. The selector valve spools are illustrated as positioned to establish a third gear forward condition which is established by the engagement of clutches 3 and 4. Fluid is directed to clutch 4 via passage 51, selector valve bore 48, passage 56, selector valve bore 57, passage 58 and valve bore 48.

At the same time that the fluid controlled by modulating relief valve 14 is delivered through passage 46 to one of the speed clutches, it also delivers fluid to the pressure differential valve 16 via passage 47, safety valve bore 61, and passage 62. Fluid in passage 62 is directed to one end of a valve bore 63 in differential valve 16 through a recess 64 which surrounds the bore 63. Disposed within valve bore 63 is a valve spool 66 which is urged leftwardly in the bore by a spring 67 one end of which is seated in the spool 66, and the other end of which is seated in a piston 68 which is slidably disposed within the bore 63. The end of valve spool 66 adjacent to recess 64 has two sets of ports 71 and 72 formed therein which lead to a hollow interior. Fluid entering valve 16 from passage 62 enters the interior of spool 66 through ports 71 and operates to urge the spool rightwardly against the spring 67. When the pressure of the fluid in passage 62 is sufficient to counteract the spring 67 and move the spool rightwardly, ports 72 register with a recess 73 which surrounds the bore 63 and which communicates with a passage 74 via a branch passage 76. Passage 74 communicates with the bore 48 of selector valve 13, and depending upon the positions of selector valve spools 52, 53 and 54, one of the load clutches receives the fluid in passage 74. As previously mentioned, the valve spools are shown positioned to effect a third gear forward condition which calls for load clutch 3 to receive fluid. The communication between clutch 3 and passage 74 is effected through bore 48, connecting passage 77, recess 78 and valve bore 79 and selector valve 12.

At the same time that fluid is being provided to one of the load clutches via passage 74, fluid is also being directed to a check valve 81 through a passage 82 one end of which communicates with passage 74 and the other end of which communicates with a valve check bore 83 through a recess 84. When fluid enters bore 83 it causes a floating check valve piston 86 slidably disposed therein to move rightwardly and contact a stop 87. In this rightward position the piston 86 blocks communication between bore 83 and a drain 88 thus making it possible for fluid pressure to build up in bore 83. When the drain 88 is effectively disconnected from the bore 83 fluid entering the recess 84 from passage 82 is directed to a passage 91 which communicates with a passage 92. One end of passage 92 leads through an orifice 93 to the bore 37 of modulating relief valve 14. The other end of passage 92 leads through an orifice 94 to an annular chamber 96 which communiactes with a passage 97 that leads to a chamber 98 behind the modulating piston 41.

The modulating piston 41 includes an annular recess 99 which registers with the orifice 93 when the piston 41 contacts an end stop 101. When recess 99 and orifice 93 register fluid is able to flow into chamber 98 from both passage 92 and passage 97 whereby the pressure buildup in chamber 98 is of a particular rate giving rise to a particular rate of pressure increase in passage 47. As the piston 41 moves leftwardly the recess 99 moves out of register with orifice 93 whereby the only source of fluid in chamber 98 is through orifice 94. In this way two different rates of pressure increase in passage 47 are effected.

Each time that a gear shift is effected, the pressure in passage 74 with drop during the period required to fill the newly selected clutch, and thus the pressure in bore 83 will also drop allowing the piston 86 to move leftwardly and uncover the drain 88. With the drain 88 uncovered the fluid in chamber 98 behind piston 41 drains quickly whereby the spring 39 urges the piston 41 against the stop 101, which is the starting point for each new modulation cycle.

From the foregoing description it is seen that as the pressure in passage 47 increases after the filling of a selected speed clutch, there is an accompanying increase in the pressure at the output of differential valve 16 which results in the piston 41 moving leftwardly making it possible for even greater pressure increases to occur in passage 47 from modulating relief valve 14. If the differential valve 16 were designed to have a fixed pressure differential between its input and output, the difference between the fluid pressure at the speed clutch and the fluid pressure at the load clutch would be fixed throughout the entire modulation cycle. The pressure differential across the valve 16 is not fixed, however, but varies depending upon the longitudinal position of a modulating piston 106 slidably disposed within a bore 105 which is slightly larger than the bore 63 of valve 16. A chamber 107 defined in part by an end stop 108 receives pressure fluid from a passage 109 which is connected to passages 111 and 112, one of which carries fluid corresponding in pressure to that regulated by modulating relief valve 14. Thus, the pressure differential which the valve 16 establishes between the selected load clutch and the selected speed clutch is a function of the regulated pressure of modulating relief valve 14 and thus the pressure in the selected speed clutch.

The speed clutch pressure which is communicated to the left end of valve spool 66 urges the spool rightwardly and is opposed by spring 67 and fluid at load clutch pressure which enters the spring chamber 60 via recess 73, bore 116 and port 117. Spool 66 is biased rightwardly by force acting on the valve due to pressure in chamber 64, and leftwardly by forces provided by spring 67 and pressure in chamber 60. These opposing forces are substantially equal during regulation and are transmitted to piston 68. Therefore, the pressure in chamber 107, which is equal to the pressure in chamber 64, would not initially move piston 106 leftwardly unless its area would exceed that of piston 68. As the piston 106 moves leftwardly it causes spring 67 to compress and thus increase the force urging the spool 66 leftwardly thereby increasing the pressure difference between passage 76 and chamber 64. While the spring 67 is selected to transmit high forces and determines what pressure difference is obtained, a spring 121 surrounding the end of piston 106 operates to transmit relatively light compensating loads and is selected to be of a size which provides that the desired maximum differential is obtained when the piston 68 abuts a stop 122 with speed clutch pressure at a predetermined value. Thus, the differential pressure may vary, for example, between 20 p.s.i. when the piston 106 abuts the stop 108, and 75 p.s.i. when the piston 68 contacts stop 122. By proper selection of the spring 121, the piston 68 contacts the stop 122 and thus the maximum pressure differential is reached at approximately the same time that the piston 47 blocks the orifice 93 and the rate of modulation produced by valve 14 changes. During the remainder of the modulation cycle, valve 14 increases its regulated pressure at a rate determined by the flow of fluid through passage 97. Thereafter the differential pressure between the fluid directed to the speed clutch and the fluid directed to the load clutch is maintained constant.

FIG. 7 graphically illustrates the operation described above which produces the operating characteristics which were initially set out as those most desirable for operation in conjunction with vehicles such as wheel loaders. Lines A and A' represent steady state operating pressures of the speed clutch and directional clutch respectively. When a shift occurs the clutches are quickly drained and the newly selected clutches begin to fill at the pressures B and B'. Once the clutches are filled the modulation cycle begins and the pressure to the speed clutch and directional clutch increases at the rate indicated by lines C and C'. At the points D and D' the maximum differential is achieved (it is to be noted that the maximum differential represented is approximately 75 p.s.i. while the initial differential is approximately 20 p.s.i.) and the remainder of the modulation cycle is at a different rate of pressure increase (as indicated by lines E and E') with the differential pressure remaining substantially constant. While the particular modulation rates illustrated in FIG. 7 have been found advantageous for actual operation with a transmittion for a wheel loader, the invention is not limited to this single configuration but can be easily altered to suit the needs of a given vehicle.

FIG. 8 illustrates in graphic form a modified modulation configuration which includes a first rate of modulation with a variable differential pressure followed by a faster rate of modulation at a fixed differential pressure. FIG. 9 illustrates a portion of a modified modulating reducing valve 14' which produces the pressure trace of FIG. 8. A recess 99' in the piston 41' is located such that an orifice 93' is blocked from the compartment 98' behind piston 41' for all but the last portion of the modulation cycle, and thus only contributes to the fluid flow provided through orifice 94' during the latter mentioned portion of the modulation cycle.

A pressure ratio valve 131 operates as the torque convertor inlet relief valve to aid in producing smooth shifts. In addition, speed clutch pressure is routed to a slug cavity 132 in the valve 131 via passage 133, annulus 134 and a port 136 in the valve spool 137. Torque convertor inlet pressure is routed to the poppet or left end of the spool 137 by means of an intercommunicating passage 138, annulus 139, port 141, opening 142, and a poppet 143. In the particular example illustrated the cross-sectional area relationship between a slug 144 associated with cavity 132 and spool 137 is approximately .39 to 1. This means that for every ten p.s.i. of speed clutch pressure there is only 3.9 p.s.i. torque convertor inlet pressure. Any pressure to the torque convertor in excess of this ratio will move valve spool 137 rightwardly and fluid will be bypassed by the transmission lubrication system via passage 146. When a shift is made the speed clutch fluid drops to fill pressure and ratio valve spool 137 moves to the right allowing torque convertor inlet fluid to be dumped to the lube circuit thus lowering the convertor inlet pressure. This reduced back pressure insures the start of modulation as established by the modulating relief valve initial setting. Since the torque convertor does not transmit much torque with the lower pressure the shift is smoother.

The safety valve 17 is provided to prevent the vehicle from being started while the transmission is in any gear other than neutral. When the vehicle is shut off (no pump pressure) a spring 147 forces a valve spool 148 rightwardly in a bore 149 until it contacts a stop 151. When safety valve 17 is in this position, communication is prevented between conduit 47 and differential valve 16 thus preventing the load clutches from being engaged. In order to move spool 148 leftwardly in order to establish the necessary communication for energizing a load clutch, the selector spools must be positioned to neutral. When in neutral fluid is routed from selector valve 13 through line 152 to the safety valve 17, and more particularly to the right end thereof. Only when neutral position is chosen does fluid flow in line 152 since the line is communicated to a drain whenever forward or reverse is selected. The fluid in line 152 is communicated to a cavity 153 via an annulus 154, a port 156 within safety valve spool 148, and a poppet 157. The poppet enables fluid to freely enter the cavity 153 from line 152 but operates to restrict the flow of fluid out of the cavity thus preventing the safety valve from resetting during a normal shift.

As previously mentioned, one of the objects of the present invention is to provide a means for preventing the transmission from being placed in a fourth speed reverse. In order to accomplish this result a shift blocker 178 is provided. Any time that the spool 54 is positioned to select reverse, fluid is routed from bore 48 by means of a passage 180 to a cavity 182 at the left end of blocker 178. With such pressure communicated to cavity 182, the blocker moves towards speed selector spool 53 and prevents the spool from being moved leftwardly into the fourth speed position. When spool 54 is positioned for forward drive, however, fluid behind the blocker 178 is cavity 182 is communicated to a drain allowing the fourth speed position to be selected if desired. If a forward to reverse shift is made while in fourth gear, the controls will automatically change the position of selector 53 to that corresponding to third gear. To prevent the inertia of the speed selector linkage and spools from downshifting past third, a damping orifice 184 is provided between the spool 52 and the drain 185. Damping is obtained by forcing fluid out of the end of bore 57 as the spool 52 moves to the right from third to second gear. This arrangement allows a normal undamped shift from fourth to third, and a damped shift out of third into second. Because of an enlargement of bore 57 and its relationship to a spool land 186, orifice 184 is bypassed during shifts from second to first gear and no damping is provided.

In addition to the blocker 178 there is associated with spool 53 an inhibitor piston 188 between shift blocker 178 and spool 53 to prevent overshifting into third when shifting from first to second. The piston 188 is biased leftwardly by a spring 190 seated at one end in the piston 188 and the other end to a step 192 in the valve bore. When the selector valves are positioned for first speed, fluid is routed behind the piston 188 causing it to move towards the spool 53. Fluid is presented behind the piston 188 as a result of the fact that clutch 6 is pressurized in both first speed forward and first speed reverse and an interconnecting passage 194 communicates clutch 6 with a cavity 196 between blocker 178 and piston 188. With piston 188 against stop 192, spool 53 may be shifted leftwardly into second gear without contacting piston 188. With any shift to second gear fluid behind the piston is connected to drain through a pair of orifices 197 and 198 such that piston 188 is restricted to slow leftward movement under the influence of spring 190. Should the operator attempt a rapid first to third shift additional effort will be required between second and third position of spool 53 because of the restriction of orifices 197 and 198. This serves to minimize operator attention for shifts between first and second by reducing the possibility of an inadvertent shift beyond second gear.

A transmission neutralizer valve 201 includes a valve spool 202 slidably disposed in a bore 203 and urged rightwardly in the bore by a spring 204. The rightward end of the bore 203 communicates with a brake-actuated pneumatic system (not shown) through a conduit 206 whereby the spool 202 is urged leftwardly against the spring 204 by air pressure when a particular brake pedal of the vehicle is operated. When this occurs, the cavity 153 behind safety valve spool 148 is communicated with a drain 207 through a conduit 208 which connects the cavity 153 with the bore 203. Communicating cavity 153 with drain 207 allows safety valve spring 147 to force valve spool 148 to the right a distance sufficient to block the flow of fluid from differential valve 16. The blocking of fluid flow from the differential valve causes the valve spool 66 to move leftwardly which results in the disengagement of the selected directional clutch, which has the effect of neutralizing the transmission.

When the cavity 153 communicates with drain 207 the rightwardly most edge 211 of safety valve spool 148 and the land edge 212 operate to meter fluid which passes into cavity 153 via conduit 47, recess 61, cross-drilled holes 213, and a central hole 214 in the valve spool 148. This fluid flow prevents full travel of the spool 148 to the right such that the valve is not reset to the full safety position and can recover when the brake is released since the holes 213 communicate with the annulus 61. Thus, when the brake pedal is released, pressure is built up behind the safety valve and it moves leftwardly allowing fluid to be routed to the directional clutches through the differential valve whereby the transmission is reengaged. Thus, the safety valve works differently in response to transmission neutralization than it does in response to an attempt to start the vehicle while the transmission is in gear. This is due to the fact that the spool 148 moves all the way to stop 151 when the vehicle has been shut down, thus requiring the gear selector to be positioned in neutral in order to reestablish fluid flow to the selected differential clutch, while the spool 148 move rightwardly only to the land edge 212 in response to neutralization. By not moving all the way to the stop 151 during neutralization, the spool 148 is positioned such that the drilled holes 213 are continuously in communication with a source of fluid making it possible for fluid pressure to be reestablished in cavity 153 without requiring a shift to neutral.

We claim:

1. In a vehicle transmission hydraulic control system the combination comprising:
   a source of hydraulic pressure fluid;
   a first hydraulically actuated friction engaging means;
   a second hydraulically actuated friction engaging means;
   modulating valve means having an input communicating with and receiving fluid from said source and an output communicating with and delivering fluid to said first friction engaging means, said modulating valve means including means automatically operable to produce a dual rate pressure increase at its output;

differential valve means having an input communicating with and receiving fluid from said modulating valve means and an output communicating with and delivering fluid to said second friction engaging means, said differential valve means including means automatically operable to maintain a pressure differential between its input and output wherein the differential varies during the first rate of pressure increase of said modulating valve means.

2. The hydraulic control system of claim 1 wherein said differential valve means is further operable to maintain a fixed pressure differential during the second rate of pressure increase of said modulating valve means.

3. The hydraulic control system of claim 2 wherein said modulating valve means includes hydraulically actuated modulating means having two rates of pressure increase, said modulation means communicating with the output of said differential valve means and operable in response to pressure fluid therefrom.

4. The hydraulic control system of claim 2 wherein said differential valve means includes hydraulically actuated modulation means to vary the pressure differential established by said differential valve means, said modulation means communicating with the output of said modulating valve means and operable in response to pressure fluid therefrom.

5. The hydraulic control system of claim 4 wherein said differential valve means further includes means responsive to a predetermined pressure from said modulating valve means to maintain a constant pressure differential in response to any further increase in the pressure of the fluid from said modulating valve means.

6. The hydraulic control system of claim 5 wherein said last named means operates in response to the pressure at said modulating valve means which corresponds to the pressure at which said modulating valve means changes its rate of pressure increase.

References Cited

UNITED STATES PATENTS

| | | | |
|---|---|---|---|
| 2,947,397 | 8/1960 | Pietsch | 192—87.13 |
| 3,151,718 | 10/1964 | Temple | 192—87.13 XR |
| 3,215,236 | 11/1965 | Pensa | 192—109 |

BENJAMIN W. WYCHE III, *Primary Examiner.*